(12) United States Patent
Church

(10) Patent No.: US 12,269,617 B2
(45) Date of Patent: Apr. 8, 2025

(54) 3D PRINTED SPACECRAFT STRUCTURES

(71) Applicant: Maxar Space LLC, Palo Alto, CA (US)

(72) Inventor: Thomas Kilborn Church, Menlo Park, CA (US)

(73) Assignee: Maxar Space LLC, Palo Alto, CA (US)

( * ) Notice: Subject to any disclaimer, the term of this patent is extended or adjusted under 35 U.S.C. 154(b) by 261 days.

(21) Appl. No.: 17/714,939

(22) Filed: Apr. 6, 2022

(65) Prior Publication Data
US 2023/0321903 A1 Oct. 12, 2023

(51) Int. Cl.
| | |
|---|---|
| *B29C 64/209* | (2017.01) |
| *B29C 64/236* | (2017.01) |
| *B29C 64/241* | (2017.01) |
| *B29C 64/393* | (2017.01) |
| *B29L 31/30* | (2006.01) |
| *B33Y 30/00* | (2015.01) |
| *B33Y 50/02* | (2015.01) |
| *B33Y 80/00* | (2015.01) |
| *B64G 1/22* | (2006.01) |
| *B64G 1/66* | (2006.01) |

(52) U.S. Cl.
CPC ............ *B64G 1/222* (2013.01); *B29C 64/209* (2017.08); *B29C 64/236* (2017.08); *B29C 64/241* (2017.08); *B29C 64/393* (2017.08); *B64G 1/66* (2013.01); *B29L 2031/3097* (2013.01); *B33Y 30/00* (2014.12); *B33Y 50/02* (2014.12); *B33Y 80/00* (2014.12)

(58) Field of Classification Search
CPC .................................................. B29C 64/209
See application file for complete search history.

(56) References Cited

U.S. PATENT DOCUMENTS

| | | | |
|---|---|---|---|
| 2015/0239148 A1* | 8/2015 | Israel ................... | B29C 64/106 |
| | | | 425/375 |
| 2016/0067919 A1* | 3/2016 | Hoyt ..................... | B29C 70/205 |
| | | | 425/375 |
| 2017/0036783 A1* | 2/2017 | Snyder .................. | B33Y 30/00 |
| 2018/0281303 A1* | 10/2018 | Yerazunis ............. | B64G 99/00 |
| 2019/0027835 A1* | 1/2019 | Hoyt ................... | H01Q 21/0087 |
| 2019/0291186 A1 | 9/2019 | Aston et al. | |
| 2021/0115274 A1* | 4/2021 | Weiss .................... | C09D 11/38 |

(Continued)

OTHER PUBLICATIONS

Mohon ("The Geometry of Success: Archinaut Project Conducts First Large-Scale Additive Manufacturing Build in Space-like Environment"—https://www.nasa.gov/technology/manufacturing-materials-3-d-printing/the-geometry-of-success-archinaut-project-conducts-first-large-scale-additive (Year: 2017).*

(Continued)

*Primary Examiner* — Galen H Hauth
*Assistant Examiner* — Ariella Machness
(74) *Attorney, Agent, or Firm* — Pearl Cohen Zedek Latzer Baratz LLP

(57) ABSTRACT

An example apparatus includes a first 3D printer head configured to form a spiral structure around a hub and a second 3D printer head configured to form a boom extending between the second 3D printer head and the hub. The apparatus further includes one or more actuators coupled to the first 3D printer head and the second 3D printer head to control a distance between the first 3D printer head and the second 3D printer head.

20 Claims, 9 Drawing Sheets

(56) References Cited

U.S. PATENT DOCUMENTS

2021/0354859 A1 11/2021 Aston et al.
2021/0362230 A1 11/2021 Aston et al.

OTHER PUBLICATIONS

Wrobel, Jonathan, et al., "Versatile Structural Radiation Shielding and Thermal Insulation Through Additive Manufacturing," SSC13-III-3, 27th Annual AIAA/USU Conference on Small Satellites, Jun. 2013, 9 pages.

* cited by examiner

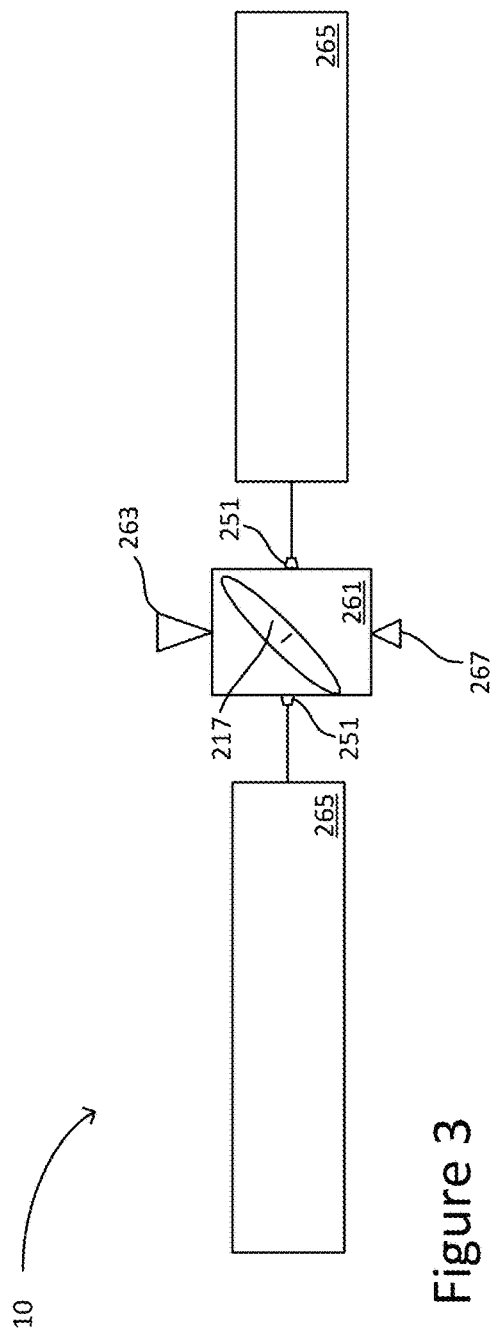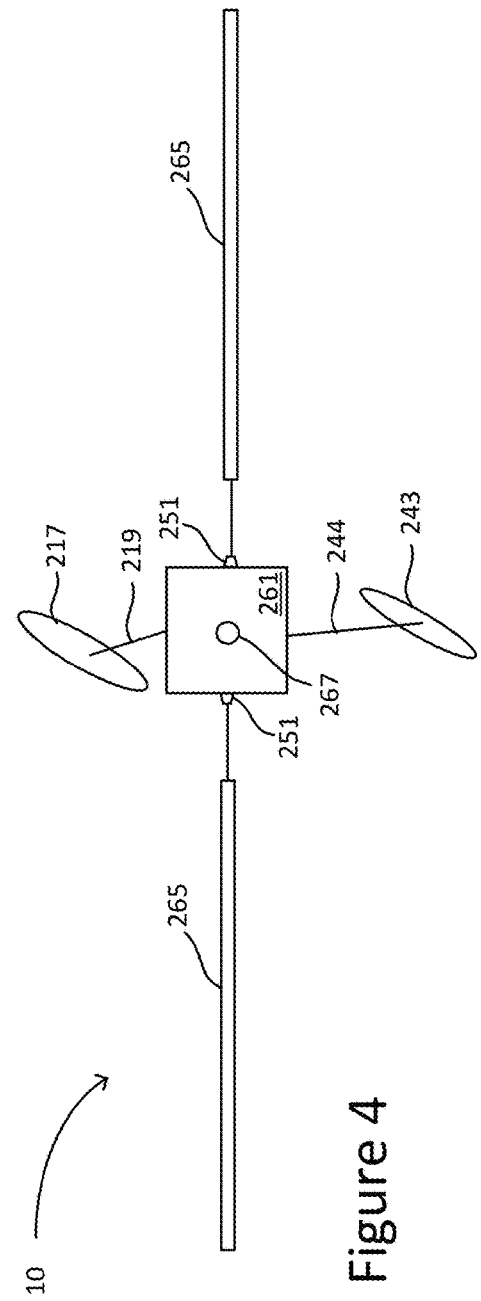

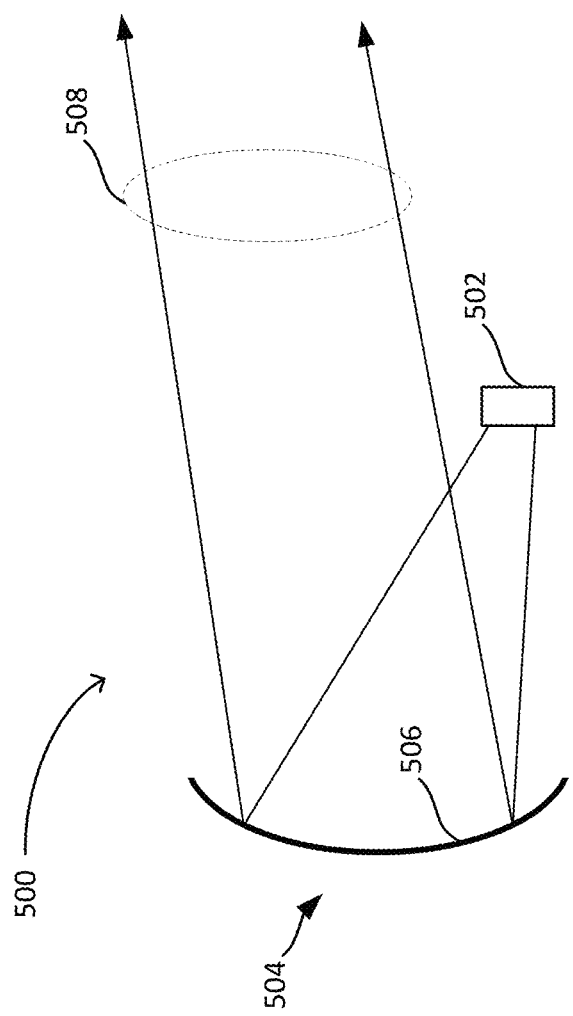

3D PRINTED SPACECRAFT STRUCTURES

BACKGROUND

The present disclosure relates to spacecraft technology.

Satellite communication systems typically include one or more satellites and a set of ground terminals. Such systems typically operate within regulations that allocate operating frequency bandwidth for a particular communications service. Satellites with embedded digital telecommunications payloads can provide advanced features such as reconfigurable switching, beamforming or beam hopping with a high degree of flexibility. Satellites (and other spacecraft such as space probes) may have one or more antennas for communicating (e.g., with ground stations).

An example of an antenna that may be used in spacecraft includes a reflector positioned to reflect RF signals to/from a feed assembly. The reflector may be in the form of a dish that has a concave surface to focus received RF radiation towards the feed assembly and/or to direct RF radiation from the feed assembly towards a target (e.g., an area of the earth). Larger reflectors (antenna apertures) may capture more RF radiation and improve efficiency. However, larger reflectors may weigh more and may be difficult to stow for launch within a limited volume.

BRIEF DESCRIPTION OF THE DRAWINGS

FIGS. 3 and 4 illustrate two views of a spacecraft including antennas.

FIG. 5 illustrates an antenna that includes a reflector.

DETAILED DESCRIPTION

Aspects of the present technology enable structures for spacecraft to be efficiently 3D printed in space. For example, relatively large concave reflectors for antennas may be 3D printed in space using a 3D printer assembly that may be relatively small. This may allow the antenna aperture to be large, which increases efficiency, without requiring a large space in a launch vehicle. And 3D printed structures may be lightweight because they do not have to survive significant forces that may be exerted during launch.

Figure 1:
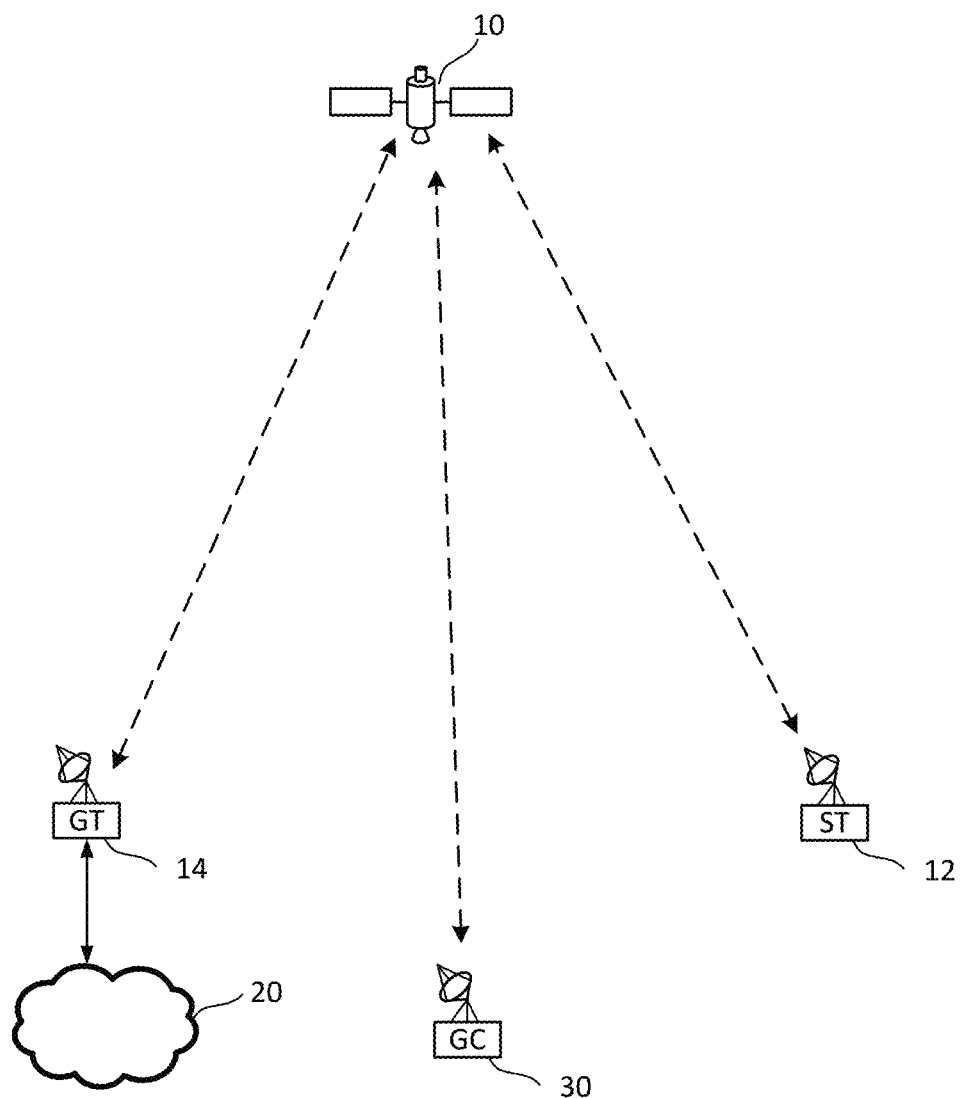
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway terminal 14, and ground control terminal 30. Subscriber terminal 12, gateway terminal 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit (LEO) satellite. Spacecraft 10 is communicatively coupled by at least one wireless feeder link to at least one gateway terminal 14 and by at least one wireless user link to a plurality of subscriber terminals (e.g., subscriber terminal 12) via an antenna system. Gateway terminal 14 is connected to the Internet 20. The system allows spacecraft 10 to provide internet connectivity to a plurality of subscriber terminals (e.g., subscriber terminal 12) via gateway terminal 14. Ground control terminal 30 is used to monitor and control operations of spacecraft 10. Spacecraft can vary greatly in size, structure, usage, and power requirements, but when reference is made to a specific embodiment for the spacecraft 10, the example of a communication satellite will often be used in the following, although the techniques are more widely applicable, including other or additional payloads such as for an optical satellite.

Figure 2:
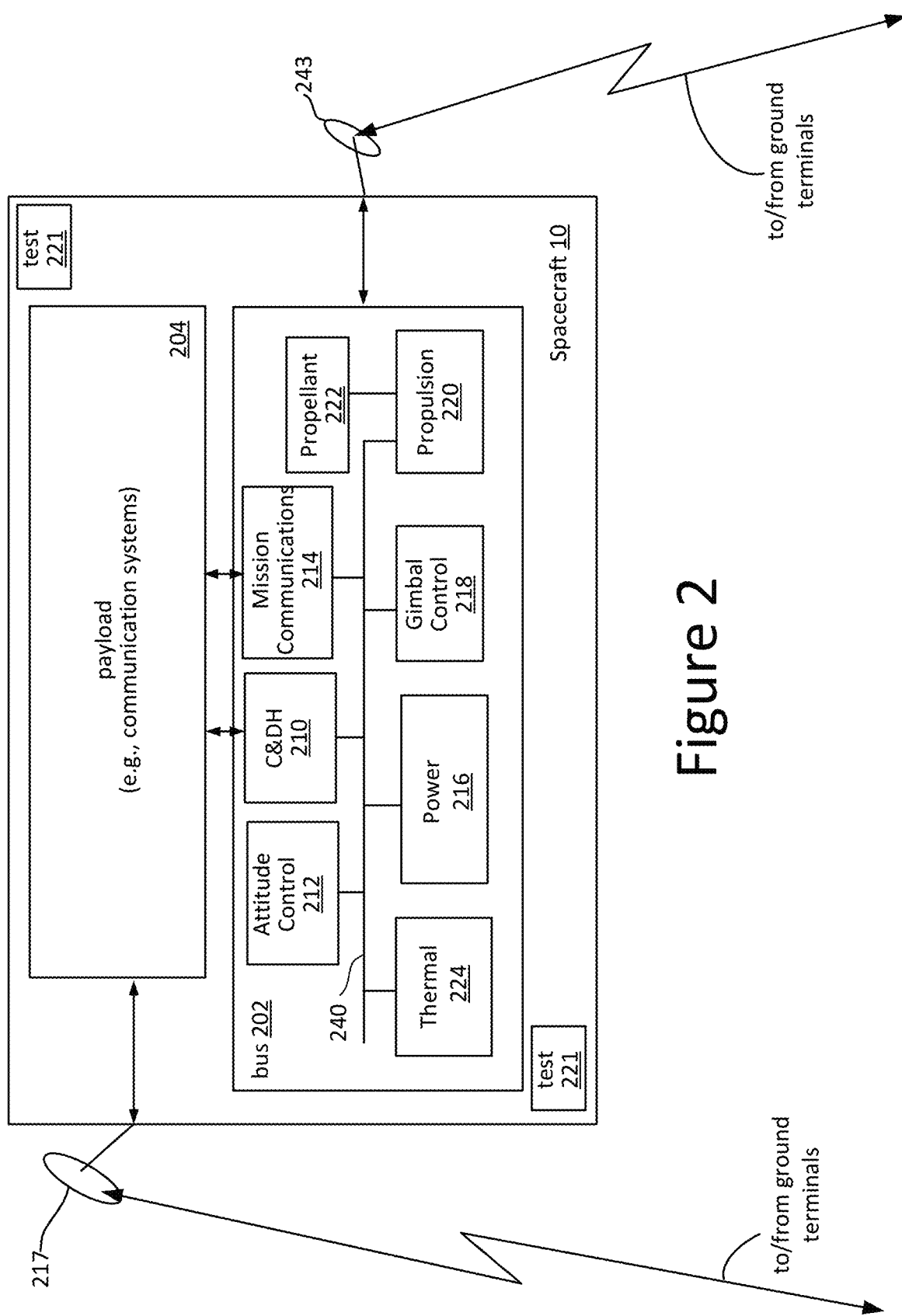
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In an example, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling module or sub-system (C&DH) 210, attitude control systems 212, mission communication systems 214, power subsystems 216, gimbal control electronics 218, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennas used by the mission communication systems 214 for exchanging communications (via RF signals) for operating of the spacecraft with ground terminals, and a payload antenna 217, that is one of one or more antennas used by the payload 204 for exchanging communications (via RF signals) with ground terminals, such as the antennas used by a communication satellite embodiment. The spacecraft can also include a number of test sensors 221, such as accelerometers that can used when performing test operations on the spacecraft. Other equipment can also be included.

The command and data handling module 210 includes any processing unit or units for handling data and commands including command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennas as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennas, solar panels, and other external extensions of the spacecraft 10.

In one embodiment, the payload 204 is for a communication satellite and includes an antenna system (represented by payload antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennas of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

FIGS. 3 and 4 show exterior views of an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Also attached to spacecraft body 261 are antennas, including payload antenna 217, which is attached to spacecraft body 261 by boom 219 and antenna 243, which is attached to spacecraft body 261 by boom 244, by which the satellite can receive and transmit signals. Attached to the spacecraft body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

While only two antennas (antenna 243 and payload antenna 217) are illustrated in FIGS. 3-4, any number of antennas may be provided on a satellite. For example, a communications payload may have multiple antennas, which may include separate receive and transmit antennas (e.g., a payload antenna system may include multiple receive antennas and multiple transmit antennas). More than one antenna may be provided for mission communication systems 214 (e.g., more than the single antenna 243 illustrated). The present technology is not limited to any particular number or configuration of antennas.

FIG. 5 shows an example of an antenna 500 that may be used in spacecraft 10 (e.g., implementing antenna 243, payload antenna 217 and/or other antennas). Antenna 500 includes a feed assembly 502 and a reflector 504. Feed assembly 502 may include one or more feed horns and/or a feed array (not shown) to transmit and/or receive RF signals. Reflector 504 reflects one or more RF signals from feed assembly 502 to form beam(s) 508 (e.g., one or more spot beams) in the example shown in FIG. 5 (where antenna 500 is transmitting). In the case where antenna 500 is receiving a signal, reflector 504 reflects an incoming signal towards feed assembly 502.

Reflector 504 has a concave shape with a concave surface 506 opening towards feed assembly 502 and a target (e.g., an area of earth). For example, concave surface 506 may be a parabolic surface and feed assembly 502 may be at or near the focal point of concave surface 506. Other possible shapes include semicircular and other concave (or dish-like) shapes. FIG. 5 shows feed assembly 502 in an offset, or off-axis, arrangement with respect to reflector 504. An axial or front-feed arrangement may also be used. Other possible configurations include a Cassegrain or Gregorian configuration that use secondary reflectors (e.g., in addition to reflector 504). Reflector may be mounted to a spacecraft (e.g., to spacecraft body 261) by a boom (not shown). Feed assembly 502 may be mounted to the spacecraft by another boom (not shown).

In some cases, it may be beneficial to use a large reflector (e.g., reflector 504) or aperture in an antenna (e.g., antenna 500) for spacecraft communication. For example, a larger reflector (larger aperture) captures more incident RF radiation than a smaller reflector and results in increased efficiency. Providing large structures, including large reflectors, may be challenging for spacecraft such as satellites and space probes that may be stowed in spaces of finite dimensions for launch (e.g., stowed within a payload fairing of a launch vehicle such as a 5 meter fairing). In some cases, a reflector may be folded for launch and later unfolded (deployed) in space. However, deployment mechanisms for such reflectors add weight and may be prone to failure. Reflectors (e.g., reflector 504) may be subject to large forces during launch so that reflectors must be relatively strong (e.g., strong enough to survive forces experienced during launch, which may be significantly greater than forces experienced on earth or in space) and may be relatively heavy (e.g., heavier than if they were designed only for space and not for launch).

Aspects of the present technology are directed to forming structures, including large structures such as antenna reflectors (e.g., reflector 504) in space. By forming such structures in space, the structures are not limited by the dimensions of a launch vehicle (e.g., may have one or more dimension that is greater than a maximum interior dimension of a launch vehicle) and are not required to survive the forces exerted during launch, which may enable lighter structures to be used. While examples described below are directed to antenna reflectors that are formed in space, other structures may also be formed using the methods described and the present technology is not limited to any particular structure.

Figure 6A:
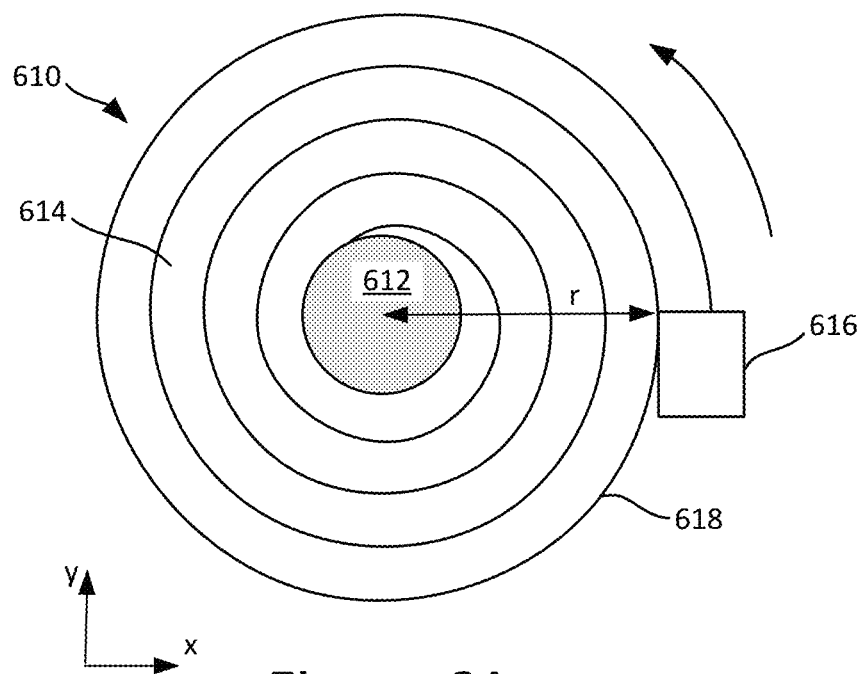
FIGS. 6A-B illustrate an example of 3D printing of an antenna reflector.

FIG. 6A shows an example of a reflector 610 that is produced by 3D printing (also known as "additive manufacturing") during manufacture (e.g., in space). Reflector 610 includes a hub 612 and a spiral structure 614 that is manufactured or printed by a first 3D printer head 616. Hub 612 turns in the direction shown by the arrow (counterclockwise in FIG. 6A) so that first 3D printer head can add material around outer edge 618 of spiral structure 614 to thereby increase the size of spiral structure 614. Reflector 610 is shown having a radius of approximately r, with first 3D printer head 616 adding material to the outer edge to increase the reflector radius. As the radius r increases, first 3D printer head 616 moves out radially (in the direction of r) with respect to hub 612 so that it continues to print along outer edge 618. Equivalently, hub 612 may be translated away from first 3D printer head 616 as radius r increases.

Figure 6B:
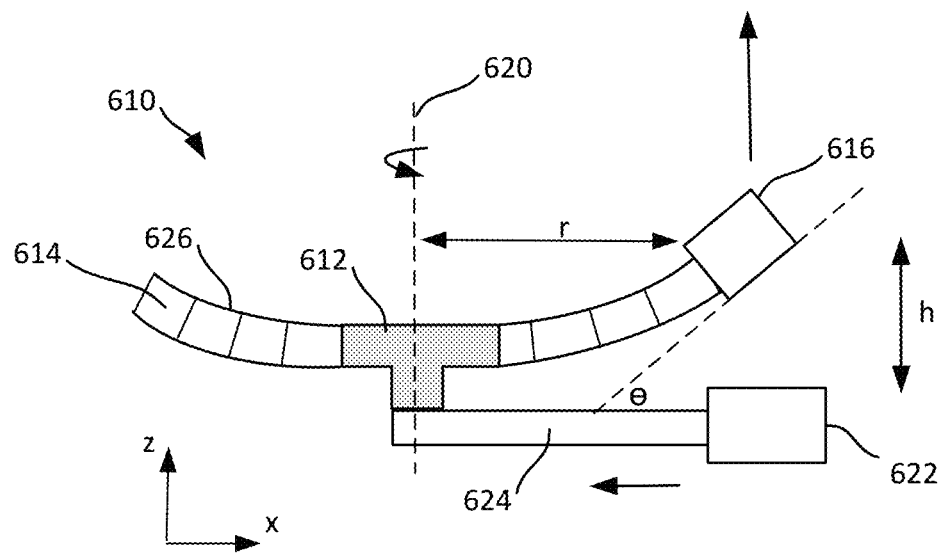

In addition to moving radially relative to hub 612, first 3D printer head 616 moves in a direction that is perpendicular to radius r (moves along the z-direction in FIGS. 6A-B). FIG. 6B shows reflector 610 in cross section along the x-z plane (perpendicular to the x-y plane of FIG. 6A) including first 3D printer head 616, which moves along the z-direction as indicated by the arrow when printing spiral structure 614 (in addition to moving outward radially along the x-direction). FIG. 6B shows a second 3D printer head 622, which forms (prints or manufactures) a boom 624 that extends linearly along the x-direction between second 3D printer head 622 and hub 612. Boom 624 is attached to hub 612 so that hub 612 may rotate about an axis of rotation 620 with respect to boom 624. An appropriate bushing or bearing (not shown) may be provided to enable rotation. First 3D printer head 616 and second 3D printer head 622 may be physically connected through one or more actuator (not shown) that controls their relative positions. In an example, first 3D printer head 616 is located substantially above (along the z-direction) second 3D printer head at a height h, with both 3D printer heads a distance r from axis of rotation 620 while first 3D printer head 616 forms spiral structure 614 and while second 3D printer head 622 forms boom 624. Printing speeds of first 3D printer head 616 and second 3D printer head 622 may be controlled to ensure that spiral structure 614 and boom 624 increase in size appropriately. As boom 624 increases in length it increases the distance between second 3D printer head 622 and hub 612 by moving one or both of 3D printer head 622 and hub 612 with respect to a spacecraft body.

In addition to moving in the x-direction (radially) and along the z-direction, orientation of first 3D printer head 616 may change while printing spiral structure 614, including its angle with respect to boom 624 (angle with respect to radius from axis of rotation 620), illustrated in FIG. 6B as Θ. As spiral structure 614 increases in size, angle Θ may be increased. The result of increasing Θ and h as r increases during formation of spiral structure 614 is a concave surface 626, facing upwards (along z-direction) in FIG. 6B. The characteristics of concave surface 626 may be controlled by appropriate control of first 3D printer head 616 and second 3D printer head 622 (e.g., control of relative positions and orientations) during printing of spiral structure 614 around hub 612.

Figure 7A:
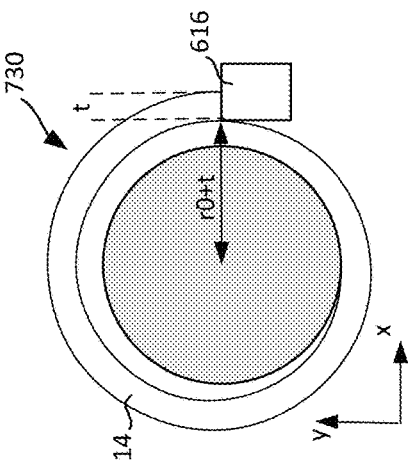
FIGS. 7A-E illustrate an example of a 3D printed antenna reflector during manufacture.

FIG. 7A shows an apparatus 730 for 3D printing a reflector prior to initiating printing (e.g., stowed for launch). Apparatus 730 includes first 3D printer head 616, which is configured to form a spiral structure (not shown) around hub 612 and second 3D printer head 622, which is configured to form boom 624 extending from hub 612. Hub 612 is free to rotate with respect to boom 624 about axis of rotation 620. First 3D printer head 616 and second 3D printer head 622 are shown a distance r0 from axis of rotation 620, where distance r0 is approximately the radius of hub 612. Thus, boom 624 has a length of approximately r0 in this view. The portion of boom 624 shown in FIG. 7A may be formed separately from the remainder of boom 624 (e.g., prior to launch, by second 3D printer head 622 or otherwise, formed of the same material or other material).

Figure 7B:
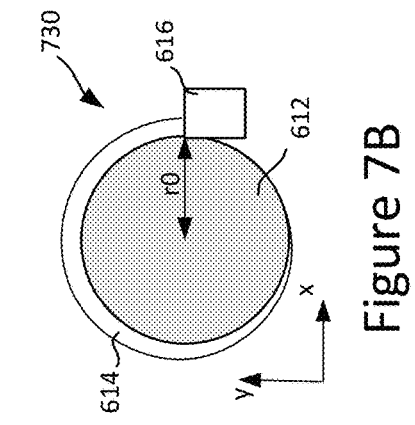

FIG. 7B shows apparatus 730 in top-down view (along z-direction) showing hub 612 having radius r0 with first 3D printer head 616 located at r0 (e.g., at same distance as shown in FIG. 7A) and provides an alternative view of the configuration shown in FIG. 7A (e.g., stowed configuration). A portion of spiral structure 614 is shown extending around a portion of hub 612 to produce a spiral shape instead of the circular shape of hub 612. The portion of spiral structure 614 shown in FIG. 7B may be formed separately from the remainder of spiral structure 614 (e.g., prior to launch, by first 3D printer head 616 or otherwise, formed of the same material or other material). In other examples, hub 612 may have a spiral (not circular) shape so that the portion of spiral structure 614 may be replaced by a portion of hub 612.

Figure 7D:
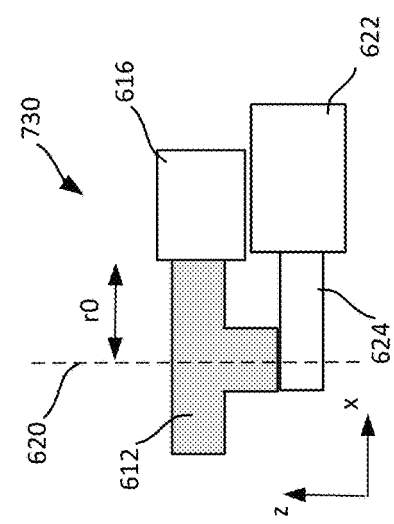
Figure 7C:
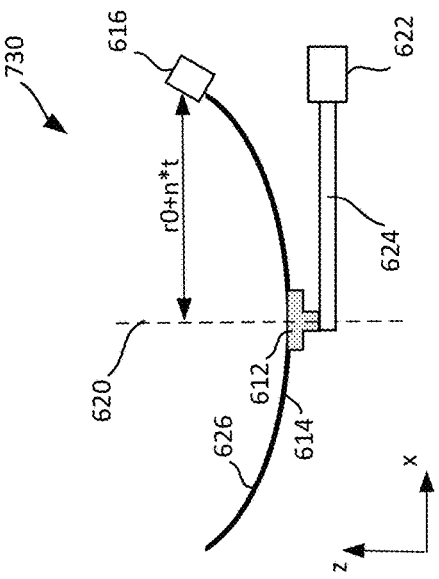

FIG. 7C shows apparatus 730 after first 3D printer head 616 has printed throughout one turn of hub 612 to increase the radius by an amount t (e.g., by the thickness, t, of material produced by first 3D printer head 616) to be r0+t. The configuration shown in FIG. 7C may correspond to an early stage of formation of spiral structure 614 (e.g., after launch and separation from a launch vehicle, when a spacecraft is in space). First 3D printer head 616 is moved out to r0+t accordingly (and second 3D printer head 622, which is not visible in FIG. 7C) is similarly moved. First 3D printer head 616 may continue to print spiral structure 614 throughout multiple turns of hub 612, which may function as a mandrel for formation of spiral structure 614.

FIG. 7D shows apparatus 730 after manufacture of spiral structure 614 (e.g., after spiral structure 614 is formed in space). FIG. 7D illustrates apparatus 730 after n turns of hub 612 while first 3D printer head 616 forms spiral structure 614 so that it includes n turns around hub 612, each of thickness t. The combination of hub 612 and spiral structure 614 has a radius of r0+n*t at this point, where n may be a number selected to achieve a desired reflector (aperture) size (e.g., 15 meters diameter). The size achievable may be much larger than the interior space used to stow apparatus 730 during launch (e.g., 15 meters or more in diameter from an apparatus that occupies a small portion of a 5 meter fairing).

Figure 7E:
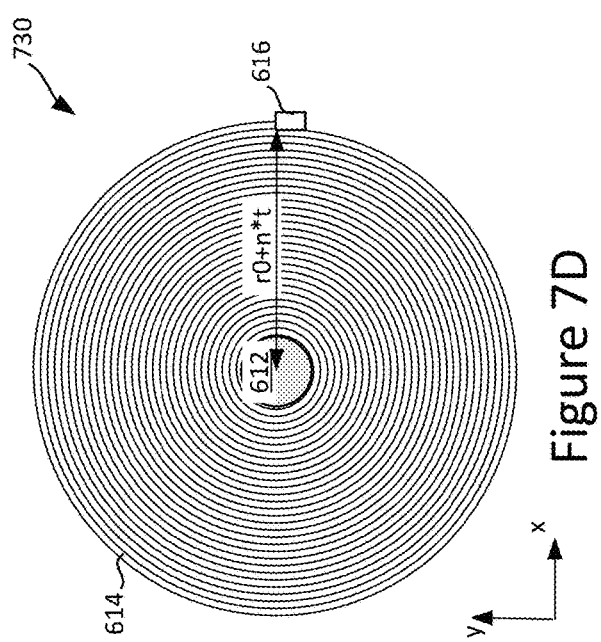

FIG. 7E illustrates apparatus 730 of FIG. 7D (e.g., manufacture of spiral structure 614) in cross section along the x-z plane. As a result of appropriately controlling relative positions of first 3D printer head 616 and second 3D printer head 622 while printing, hub 612 and spiral structure 614 form a concave surface 626, which may be used as a reflector for an antenna (e.g., as reflector 504 of antenna 500). The length of boom 624 is r0+n*t so that first 3D printer head 616 and second 3D printer head 622 remain aligned (about the same distance from axis of rotation 620). Hub 612 and spiral structure 614 may form a reflector of an antenna with boom 624 holding the reflector in place with respect to a satellite body (e.g., booms 219, 244, may be implemented by boom 624).

The rate of forming boom 624 and spiral structure 614 may be controlled so that the length of boom 624 remains equal to the radius of spiral structure 614 and the rate of increase in the radius of spiral structure 614 is equal to the rate of forming boom 624. It can be seen from FIGS. 7C-D that the amount of material printed by first 3D printer head 616 to produce a ring of spiral structure 614 increases as spiral structure 614 becomes bigger (e.g., each ring may require a length 2πr of material where radius r of spiral structure 614 increases by t for each ring) so that, if first 3D printer head 616 produces material at a constant rate, rings may take increasingly long to form. In contrast, boom 624 may be lengthened by about t for each additional ring added so that second 3D printer head 622 may print more slowly as spiral structure 614 increases in size in order to keep first 3D printer head 616 and second 3D printer head 622 aligned.

Alternatively, first 3D printer head 616 may speed up, or some combination of printing rate changes may be used.

First 3D printer head 616 and second 3D printer head 622 may perform 3D printing using any suitable technology including, but not limited to, material jetting, polymerization, fused filament fabrication, binder jetting, material extrusion, directed energy deposition, and inkjet 3D printing and may use any suitable feedstock (raw material) according to the technique employed.

While the present drawings show 3D printed components (e.g., boom 624 and spiral structure 614) as solid forms, this is for illustration purposes and 3D printing allows such components to be formed in various ways that may be lighter than solid components. For example, boom 624 may be a hollow boom (e.g., a tube or pipe), honeycombed, or may be in the form of a truss (formed as a 3D lattice). Similarly, spiral structure 614 may be formed of strips that are hollow, honeycombed, or otherwise not solid.

In some cases, spiral structure 614 may be printed of a suitable material or materials so that it reflects RF signals adequately to be used in an antenna. In other examples, an additional layer or cover layer (not shown) may be applied to cover concave surface 626 to enable use as a reflector in an antenna. Such a cover layer may be formed of a suitable material (e.g., an electrically conductive material such as a metal) so that RF signals are efficiently reflected. For example, first 3D printer head may include components (not shown) such as a roller, nozzle, or other cover layer applicator to roll-on, spray-on or otherwise apply or attach a cover layer to cover concave surface 626.

Figure 8:
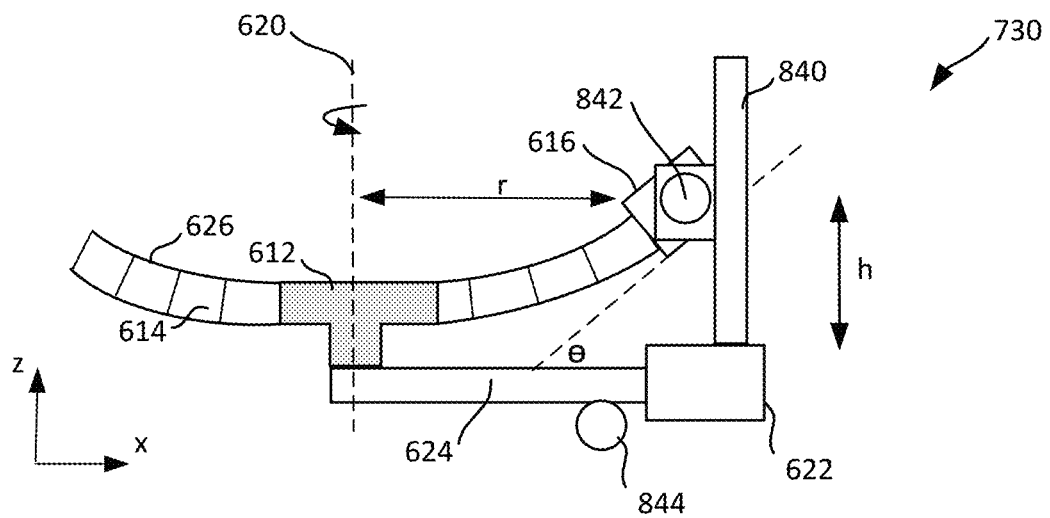
FIG. 8 illustrates an example of a 3D printing assembly that includes actuators for moving 3D printing heads.

FIG. 8 illustrates an example implementation of apparatus 730 that includes actuator 840 to control the height h of first 3D printer head 616 with respect to second 3D printer head 622 and actuator 842 to control angle Θ of first 3D printer head 616 with respect to boom 624. Actuators such as actuators 840, 842 may be configured to control the relative positions and orientations of first 3D printer head 616 and second 3D printer head 622 (and in some cases boom 624 and/or spiral structure 614). For example, actuator 840 may be a linear drive that is attached to first 3D printer head 616 and second 3D printer head and can increase (or decrease) the distance h between them. Actuator 842 may be a motor (e.g., stepper motor) that is connected between first 3D printer head 616 and actuator 840 so that it can increase (or decrease) the angle Θ between printer head 616 and boom 624 (which extends radially from axis of rotation 620). FIG. 8 also shows motorized wheel 844 which provides force to move second 3D printer head radially (with respect to hub 612) as it forms boom 624. An additional motorized wheel or wheels (not shown) may provide rotational force to rotate hub 612 and spiral structure 614.

Figure 9:
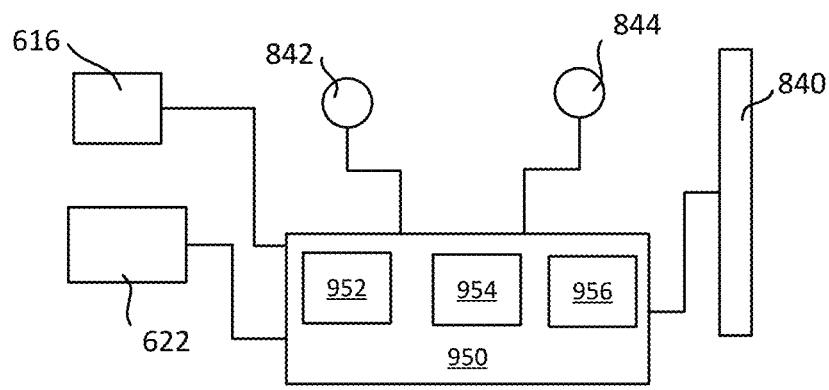
FIG. 9 illustrates an example of control circuits of a 3D printing assembly.

FIG. 9 shows first 3D printer head 616, second 3D printer head 622, actuator 842, motorized wheel 844 and actuator 840 electrically connected to control circuits 950. Control circuits 950 include a processor 952 (e.g., microprocessor), data storage circuit 954 (e.g., volatile, or non-volatile memory) and communication circuit 956. Processor 952 may control first 3D printer head 616, second 3D printer head 622, actuator 842, motorized wheel 844 and actuator 840 (and other components in some examples) according to instructions that are stored in data storage circuit 954 (e.g., to cause first 3D printer head 616, second 3D printer head 622, actuator 842, motorized wheel 844 and actuator 840 to print a reflector for an antenna such as reflector 504 to have a predetermined shape). Communication circuit 956 may allow such instructions to be updated and/or replaced with new instructions so that a different structure may be produced (e.g., different shape or size). For example, a spacecraft that is launched with instructions for one or more structures (designs) stored in data storage circuit 954 may receive instructions for one or more additional designs via communication circuit 956, which may then be implemented by processor 952 controlling first 3D printer head 616, second 3D printer head 622, actuator 842, motorized wheel 844 and actuator 840. This may allow manufacture of customized structures according to needs (e.g., replacing broken components) while in space (e.g., by a service robot). Communication circuit 956 may also receive commands (e.g., from a ground terminal or from another circuit on a spacecraft) relating to manufacture of a structure (e.g., a command to initiate manufacture of one or more reflectors when a spacecraft is in space).

In some cases, a spacecraft may include multiple 3D printer assemblies (e.g., 3D printer assemblies that include a first 3D printer head, a second 3D printer head and one or more actuators configured to increase a distance between the first 3D printer head and the second 3D printer head during formation of the spiral structure such that the spiral structure has a concave surface as illustrated in FIG. 8) with each 3D printer assembly configured to 3D print a respective reflector for a respective antenna. Each such assembly may have separate control circuits (e.g., control circuits 950) or may share control circuits (e.g., control circuits 950 may control more than one set of printer heads and actuators). In some examples, a 3D printer assembly may be a single-use apparatus that is used to form a single reflector while in other examples, a 3D printer assembly may be used more than once to form more than one reflector. For example, after completing spiral structure 614, first 3D printer head 616, second 3D printer head 622, actuator 842 and actuator 840 may be used to form another spiral structure (not shown) that may be identical to spiral structure 614 or may be different (e.g., using different instructions from data storage circuit 954).

A spiral structure (e.g., spiral structure 614) may be formed around a hub in various ways. For example, first 3D printer head 616 may form substantially concentric rings of material so that an individual ring is physically connected to a prior ring, e.g., by fusing material, gluing, or otherwise adhering neighboring rings. In an example, a ring of spiral structure 614 is physically connected to neighboring rings by one or more engagement features (instead or in addition to adhering by fusing, gluing, etc.).

Figure 10A:
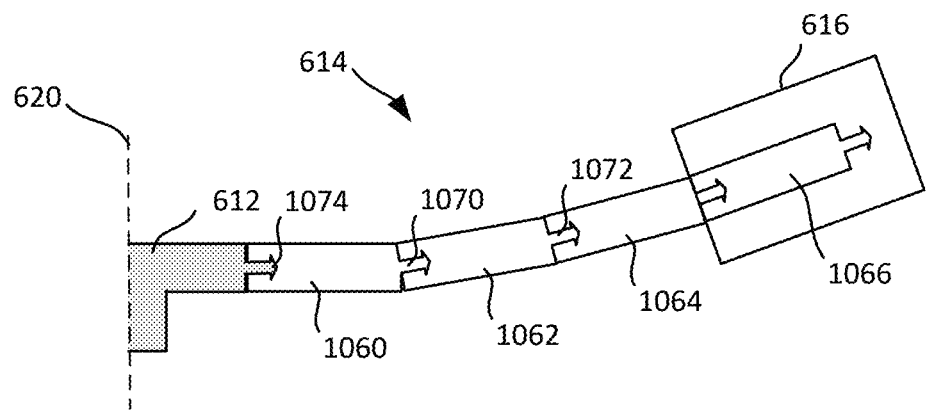
FIGS. 10A-B illustrate engagement features of rings in a spiral structure that form a reflector.

FIG. 10A illustrates an example implementation of spiral structure 614. FIG. 10A shows a portion of spiral structure 614 that is formed by rotating hub 612 about axis of rotation 620 as first 3D printer head 616 prints rings of material including first ring 1060, second ring 1062, third ring 1064 and fourth ring 1066 (shown in cross section of first 3D printer head 616 as it is printed). While FIG. 10A shows rings 1060, 1062, 1064, 1066 as distinct, rings 1060, 1062, 1064, 1066 may be formed as a continuous strip of material by first 3D printer head 616. Each ring has engagement features that engage with corresponding features of neighboring rings so that an individual ring is physically connected to rings on either side. For example, second ring 1062 is physically engaged by engagement feature 1070 with first ring 1060 that is inward of (closer to axis of rotation 620) second ring 1062 and engaged by engagement feature 1072 with third ring 1064 that is outward of (farther from axis of rotation 620) second ring 1062. Hub 612 is shown having engagement feature 1074 to engage with first ring 1060 so that spiral structure 614 is appropriately physically connected to hub 612.

Figure 10B:
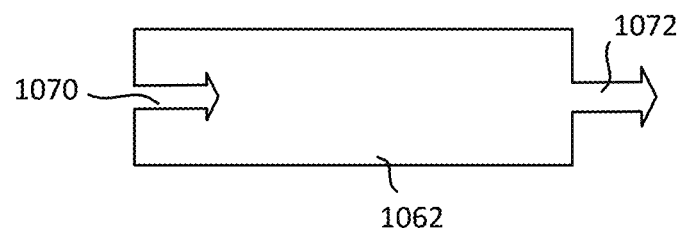

FIG. 10B shows second ring 1062 in cross section including engagement feature 1070 and engagement feature 1072 (other rings may have similar or identical features). Engagement features 1070, 1072 provide a barbed tongue-and-groove arrangement with engagement feature 1070 corresponding to a groove that is configured to engage with a tongue-like engagement feature (e.g., engagement feature 1072). First 3D printer head 616 may form each ring so that it incorporates one or more features of the ring inward of it (e.g., second ring 1062 may be printed around engagement feature 1072 of first ring 1060). Other engagement features and/or fusing, bonding, gluing or other adhesion may be implemented using first 3D printer head to ensure physical connection of rings 1060, 1062, 1064, 1066. While FIGS. 10A-B show rings 1060, 1062, 1064, 1066 having the same cross sectional shape, in some cases, the cross sectional shape of different rings may be different (e.g., first 3D printer head 616 may change the shape of material it prints as the radius of spiral structure 614 increases).

While examples described above refer to forming a concave surface for an antenna reflector, the present technology may be used to form flat (non-concave) surfaces and convex surfaces of various sizes. For example, an apparatus for capturing debris in space ("space junk") may use a large concave surface to collect such debris in space. A spiral structure may be 3D printed to form such a collector substantially as described above.

Figure 11:
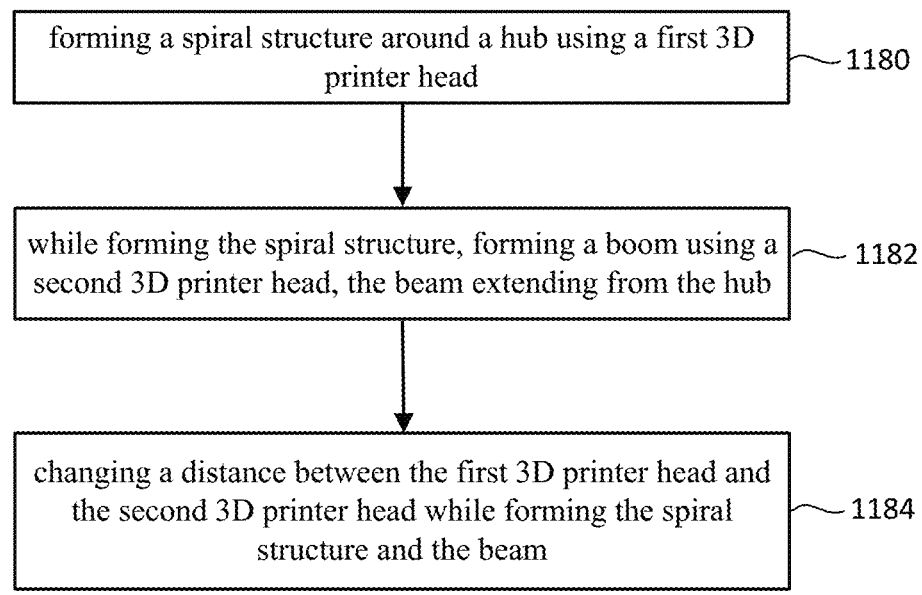
FIG. 11 illustrates a method of forming a spiral structure.

FIG. 11 illustrates an example of a method that includes forming a spiral structure around a hub using a first 3D printer head 1180 (e.g., first 3D printer head 616) and, while forming the spiral structure, forming a boom using a second 3D printer head (e.g., second 3D printer head 622), the boom extending between the second 3D printer head and the hub. The method further includes changing a distance between the first 3D printer head and the second 3D printer head while forming the spiral structure and the boom (e.g., changing distance h shown in FIG. 6B). The method may also include controlling an angle of the first 3D printer head with respect to the boom and controlling a rate of forming the boom with respect to a rate of forming the spiral structure such that a radius of the spiral structure increases equally with the rate of forming the boom.

One embodiment includes an apparatus comprising: a first 3D printer head configured to form a spiral structure around a hub; a second 3D printer head configured to form a boom extending between the second 3D printer head and the hub; and one or more actuators coupled to the first 3D printer head and the second 3D printer head to control a distance between the first 3D printer head and the second 3D printer head.

The one or more actuators may be additionally configured to change an angle of the first 3D printer head with respect to the boom. The one or more actuators may be configured to increase the distance between the first 3D printer head and the second 3D printer head and increase the angle of the first 3D printer head with respect to the boom such that the spiral structure has a concave surface. The spiral structure may be formed as a plurality of substantially concentric rings with an individual ring physically connected to rings on either side. The individual ring may be physically engaged by one or more engagement features with a first ring that is inward of the individual ring and with a second ring that is outward of the individual ring. The boom may be a hollow boom or a truss. The apparatus may include a cover layer applicator configured to apply a cover layer on a concave surface of the spiral structure. A surface of the hub may be configured to form a portion of a substantially parabolic surface and the first 3D printer head may be configured to form the spiral structure to form another portion of the substantially parabolic surface. The apparatus may include a control circuit configured to control the one or more actuators to produce the spiral structure in a predetermined shape. The apparatus may be installed in a spacecraft with a feed assembly such that the spiral structure and the hub form a reflector and the reflector and the feed assembly form an antenna for spacecraft communication.

One embodiment includes a method that includes forming a spiral structure around a hub using a first 3D printer head; while forming the spiral structure, forming a boom using a second 3D printer head, the boom extending between the second 3D printer head and the hub; and changing a distance between the first 3D printer head and the second 3D printer head while forming the spiral structure and the boom.

The method may further include controlling an angle of the first 3D printer head with respect to the boom. The method may further include, while forming the spiral structure, increasing the distance between the first 3D printer head and the second 3D printer head, and increasing the angle of the first 3D printer head with respect to the boom to form the spiral structure with a concave surface. The method may further include controlling a rate of forming the boom with respect to a rate of forming the spiral structure such that a radius of the spiral structure increases equally with the rate of forming the boom.

One embodiment includes a satellite that includes a spacecraft body; and one or more 3D printer assemblies attached to the spacecraft body, each 3D printer assembly comprising: a first 3D printer head configured to form a spiral structure around a hub; a second 3D printer head configured to form a boom extending between the second 3D printer head and the hub; and one or more actuators configured to increase a distance between the first 3D printer head and the second 3D printer head during formation of the spiral structure such that the spiral structure has a concave surface.

Each 3D printer assembly may be configured to form a respective reflector for a respective antenna. Each 3D printer assembly may be configured to form the respective reflector to have a parabolic surface and each antenna may include a feed assembly at or near a focal point of the parabolic surface. The satellite may include a control circuit that controls at least one of the one or more 3D printer assemblies to form the spiral structure according to a design; and a data storage circuit that stores the design. The satellite may include a communication circuit connected to the data storage circuit, the communication circuit configured to receive one or more additional designs for storage in the data storage circuit and for implementation by the at least one of the one or more 3D printer assemblies controlled by the control circuit. The control circuit may further control an angle of the first 3D printer head with respect to the boom and control a rate of forming the boom with respect to a rate of forming the spiral structure such that a radius of the spiral structure increases equally with the rate of forming the boom.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the present technology be defined by the claims appended hereto.

What is claimed is:

1. An apparatus, comprising:
    a boom;
    a hub that is connected to the boom and is rotatable about an axis of rotation with respect to the boom;
    a first 3D printer head configured to add material around the hub to form a spiral structure around the hub;
    a second 3D printer head configured to add material linearly from the boom to extend the boom in a direction perpendicular to the axis of rotation between the second 3D printer head and the hub;
    one or more actuators coupled to the first 3D printer head and the second 3D printer head to control a distance between the first 3D printer head and the second 3D printer head; and
    a control circuit configured to control the first 3D printer head to form the spiral structure and control the second 3D printer head to form the boom.

2. The apparatus of claim 1, wherein the one or more actuators are additionally configured to change an angle of the first 3D printer head with respect to the boom.

3. The apparatus of claim 2, wherein the one or more actuators are configured to increase the distance between the first 3D printer head and the second 3D printer head and increase the angle of the first 3D printer head with respect to the boom such that the spiral structure has a concave surface.

4. The apparatus of claim 1, wherein the first 3D printer head is configured to form the spiral structure as a plurality of turns with an individual turn physically connected to adjacent turns on either side and an inner turn connected to the hub.

5. The apparatus of claim 4, wherein the first 3D printer head is configured to add the material with engagement features such that each individual turn is physically engaged by one or more engagement features with a first turn that is inward of the individual turn and with a second turn that is outward of the individual turn.

6. The apparatus of claim 1, wherein the boom is a hollow boom or a truss.

7. The apparatus of claim 1, further comprising a cover layer applicator configured to apply a cover layer on a concave surface of the spiral structure.

8. The apparatus of claim 1, wherein a surface of the hub that extends around the axis of rotation is concave.

9. The apparatus of claim 1, wherein the control circuit is further configured to control the first 3D printer head and the second 3D printer head such that the radius of the spiral structure is equal to the extended length of the boom.

10. The apparatus of claim 1, wherein the apparatus is installed in a spacecraft with a feed assembly such that the spiral structure and the hub form a reflector and the reflector and the feed assembly form an antenna for spacecraft communication.

11. The apparatus of claim 1, wherein the axis of rotation extends along the z-direction, the boom extends in a straight line perpendicular to the axis of rotation, along the x-direction, and the one or more actuators includes a linear actuator that is configured to increase a distance in the z-direction between the first 3D printer head and the second 3D printer head.

12. The apparatus of claim 11, wherein the one or more actuators further includes a second actuator that controls angular orientation of the first 3D printer head with respect to the boom.

13. The apparatus of claim 12, further comprising a first motorized wheel configured to provide force to move the second 3D printer head in a radial direction with respect to the axis of rotation and a second motorized wheel configured to provide rotational force to rotate the hub and the boom.

14. The apparatus of claim 13, wherein the linear actuator is a linear drive that is attached to the first 3D printer head and the second 3D printer head and the second actuator is a stepper motor connected between the first 3D printer head and the linear actuator.

15. A method, comprising:
    adding material around a hub by a first 3D printer head to form a spiral structure around the hub;
    adding material linearly to a boom by a second 3D printer head, the boom rotatably connected to the hub such that the hub rotates with respect to the boom about an axis of rotation that extends along a first direction while material is added by the first 3D printer head to increase the radius of the spiral structure at a controlled rate and by the second 3D printer head to increase the length of the boom along a second direction that is perpendicular to the first direction at the controlled rate; and
    controlling distance between the first 3D printer head and the second 3D printer head while material is added by the first and second 3D printer heads and while the hub rotates with respect to the boom such that added material forms the spiral structure around the hub with a concave surface.

16. The method of claim 15, further comprising:
    controlling an angle of the first 3D printer head with respect to the boom while adding the material around the hub.

17. The method of claim 16 further comprising:
    moving the second 3D printer head with respect to the hub using a motorized wheel.

18. An apparatus, comprising:
    a boom;

a hub that is connected to the boom and is rotatable about an axis of rotation with respect to the boom and the boom extends perpendicular to the axis of rotation;

a first 3D printer head configured to add material around the hub to form a spiral structure around the hub that increases in radius;

a second 3D printer head configured to add material linearly from the boom to extend the boom in a straight line perpendicular to the axis of rotation between the second 3D printer head and the hub;

a plurality of actuators coupled to the first 3D printer head and the second 3D printer head to control a distance between the first 3D printer head and the second 3D printer head and an angle of the first 3D printer head with respect to the boom such that the distance and the angle increase with boom length; and a control circuit configured to control the rates at which the spiral structure radius and boom length increase such that the boom length and spiral structure radius increase at the same rate.

19. The apparatus of claim 18, wherein the plurality of actuators includes a linear drive that is attached to the first 3D printer head and the second 3D printer head to control the distance and a stepper motor connected between the first 3D printer head and the linear drive to control the angle of the first 3D printer head.

20. The apparatus of claim 19, further comprising a first motorized wheel configured to move the second 3D printer head away from the hub and a second motorized wheel configured to rotate the hub with respect to the boom.

* * * * *